United States Patent
Schad et al.

(10) Patent No.: US 7,611,346 B2
(45) Date of Patent: Nov. 3, 2009

(54) MOLDING-SYSTEM CLAMP

(75) Inventors: Robert Dietrich Schad, North York (CA); Alex Teng, Richmond Hill (CA)

(73) Assignee: Husky Injection Molding Systems Ltd., Bolton ON (CA)

(*) Notice: Subject to any disclaimer, the term of this patent is extended or adjusted under 35 U.S.C. 154(b) by 251 days.

(21) Appl. No.: 11/671,092

(22) Filed: Feb. 5, 2007

(65) Prior Publication Data
US 2008/0187771 A1    Aug. 7, 2008

(51) Int. Cl.
*B29C 45/64* (2006.01)
(52) U.S. Cl. .............. 425/190; 425/590; 425/595
(58) Field of Classification Search .......... 425/190, 425/589, 590, 595, 450.1, 451.2, 451.9
See application file for complete search history.

(56) References Cited

U.S. PATENT DOCUMENTS

| | | | | |
|---|---|---|---|---|
| 3,093,863 | A | * | 6/1963 | Ehlert .................. 425/595 |
| 3,528,134 | A | * | 9/1970 | Fischbach ............ 425/595 |
| 3,540,081 | A | * | 11/1970 | Carrieri et al. ....... 425/595 |
| 4,029,457 | A | | 6/1977 | Yamamoto |
| 4,032,277 | A | * | 6/1977 | Linde et al. .......... 425/595 |
| 4,504,208 | A | * | 3/1985 | Kurumaji et al. ..... 425/595 |
| 5,066,217 | A | * | 11/1991 | Fukuzawa et al. .... 425/595 |
| 5,211,970 | A | | 5/1993 | Sakurai et al. |
| 5,275,550 | A | * | 1/1994 | Romi .................. 425/595 |
| 5,308,234 | A | | 5/1994 | Nicke et al. |
| 5,320,517 | A | | 6/1994 | Hirata et al. |
| 5,338,171 | A | | 8/1994 | Hayakawa et al. |
| 5,368,463 | A | | 11/1994 | Kassner et al. |
| 5,439,369 | A | | 8/1995 | Wang |
| 5,624,695 | A | | 4/1997 | Glaesener et al. |
| 5,645,875 | A | | 7/1997 | Glaessener et al. |
| 5,776,516 | A | | 7/1998 | Armbruster et al. |
| 5,868,989 | A | | 2/1999 | Glaesener |
| 5,879,726 | A | * | 3/1999 | Hsing .................. 425/595 |
| 5,922,372 | A | | 7/1999 | Schad |
| 6,093,361 | A | | 7/2000 | Schad |
| 6,120,724 | A | | 9/2000 | Glaesener |
| 6,200,123 | B1 | | 3/2001 | Mailliet et al. |
| 6,210,144 | B1 | | 4/2001 | Mailliet et al. |
| 6,241,509 | B1 | | 6/2001 | Galt et al. |
| 6,250,905 | B1 | | 6/2001 | Mailliet et al. |
| 6,261,505 | B1 | * | 7/2001 | Glaesener ............. 425/595 |

(Continued)

FOREIGN PATENT DOCUMENTS

EP    1287967    3/2003

(Continued)

*Primary Examiner*—James Mackey

(57) ABSTRACT

A clamp actuator of a molding system is provided. The clamp actuator includes a first actuator configured to be interactable with a rod; and a second actuator configured to be interactable with the first actuator. The first actuator is configured to apply a clamping force to the rod; and the second actuator is configured to apply a force opposing the clamping force to the first actuator. Responsive to actuating the first actuator, the rod is drivable between (i) a home position in which a clamping force is not applicable to the rod, and (ii) a force application position in which the clamping force is applicable to the rod. Responsive to a mold flash occurring which exceeds the clamping force, the rod is moveable into a mold flash position beyond the home position.

9 Claims, 12 Drawing Sheets

U.S. PATENT DOCUMENTS

| | | |
|---|---|---|
| 6,533,573 B2 | 3/2003 | Tamaki et al. |
| 6,767,204 B2 | 7/2004 | Fuller |
| 6,811,388 B2 | 11/2004 | Kitayama et al. |
| 6,893,250 B2 | 5/2005 | Meschia et al. |
| 6,908,584 B2 * | 6/2005 | Cole ..................... 425/451.9 |
| 6,935,111 B2 | 8/2005 | Dantlgraber |
| 6,945,765 B2 | 9/2005 | Roetzel |
| 7,080,978 B2 * | 7/2006 | Glaesener ................... 425/595 |
| 2004/0058032 A1 * | 3/2004 | Felix ......................... 425/595 |
| 2005/0129805 A1 | 6/2005 | Jeanjean et al. |
| 2005/0287246 A1 | 12/2005 | Looije |
| 2007/0048401 A1 | 3/2007 | Jung et al. |
| 2007/0132147 A1 | 6/2007 | Looije |

FOREIGN PATENT DOCUMENTS

| | | |
|---|---|---|
| GB | 929509 A | 6/1963 |
| GB | 1601419 | 10/1981 |

* cited by examiner

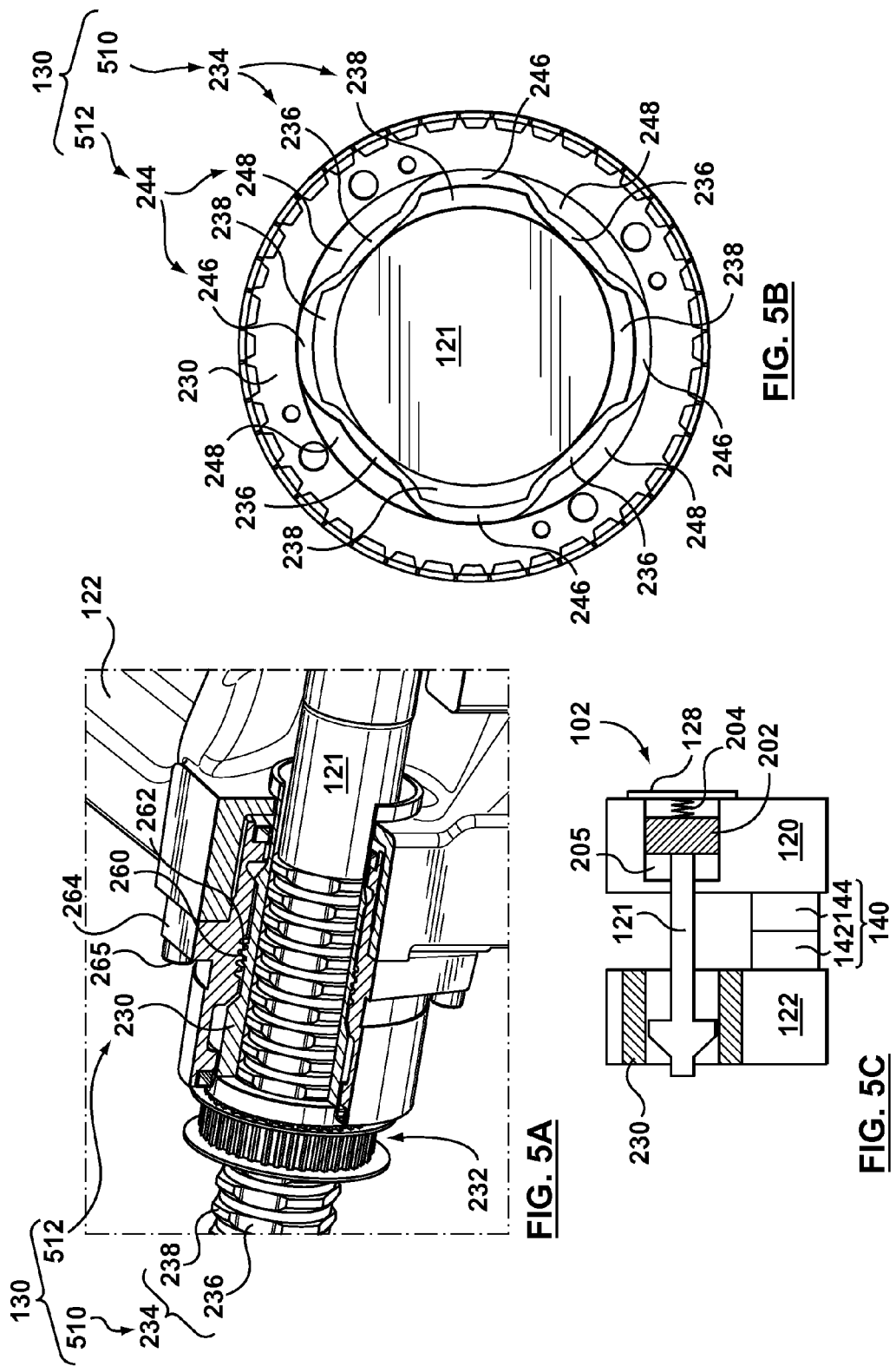

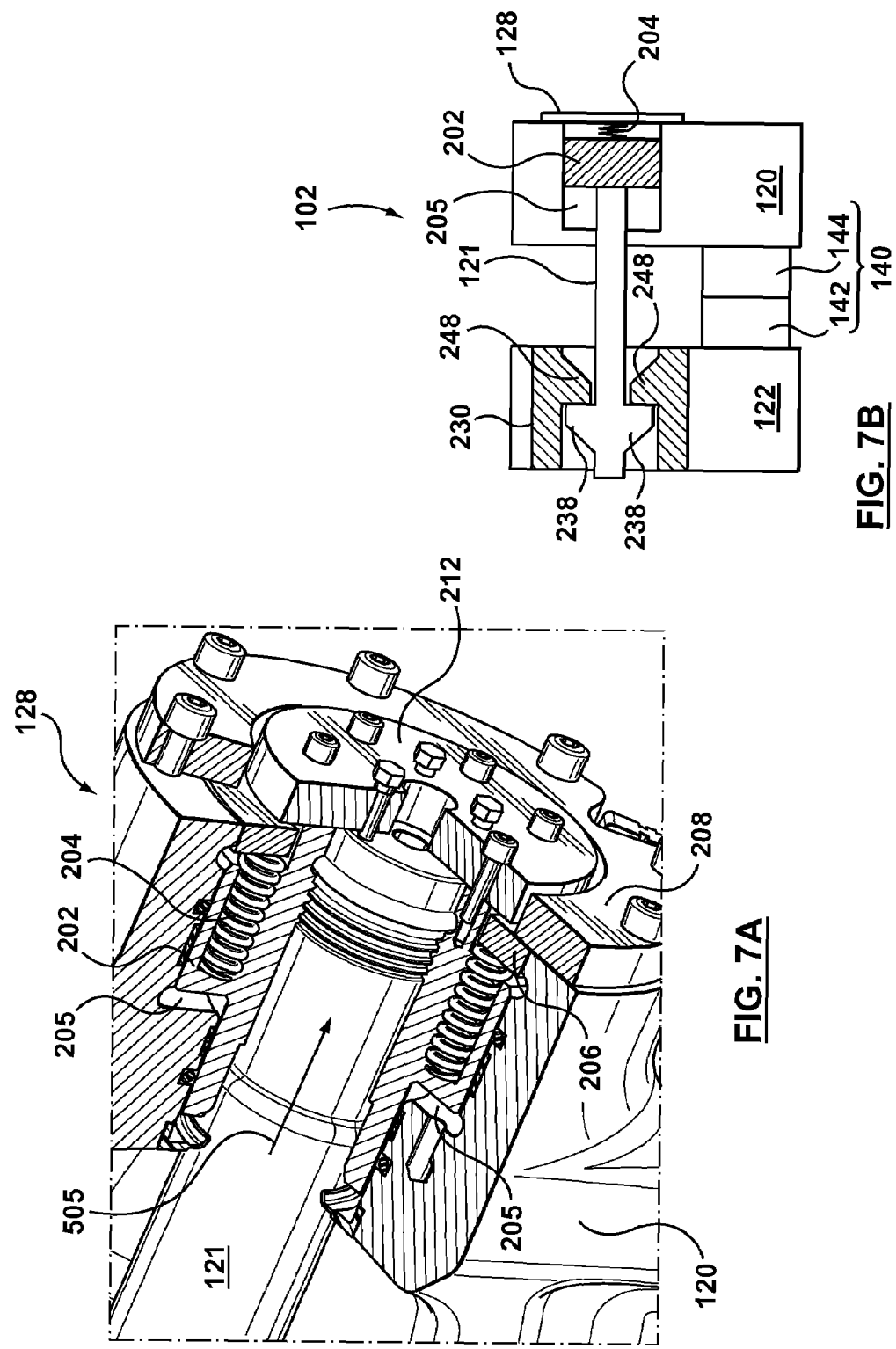

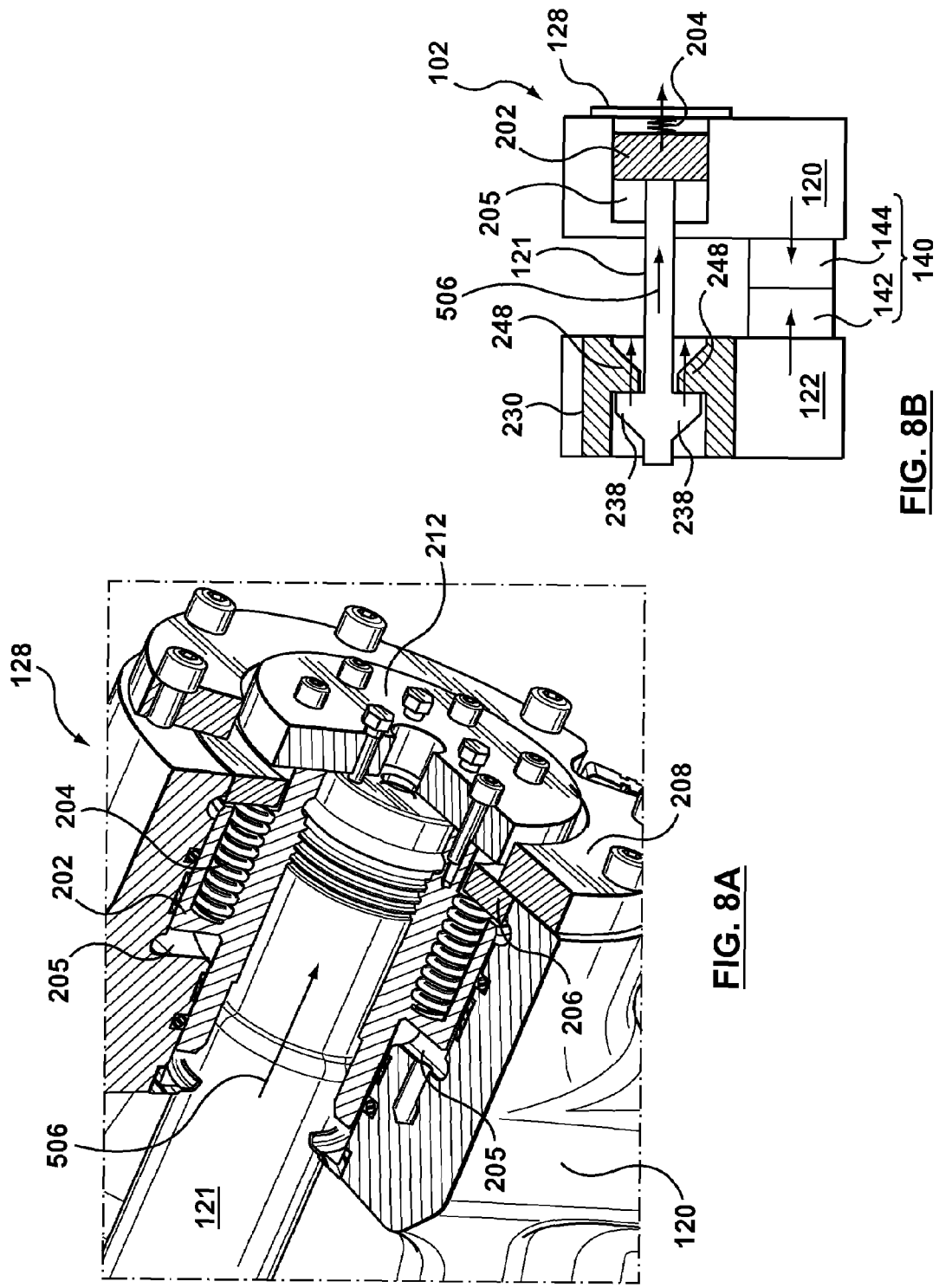

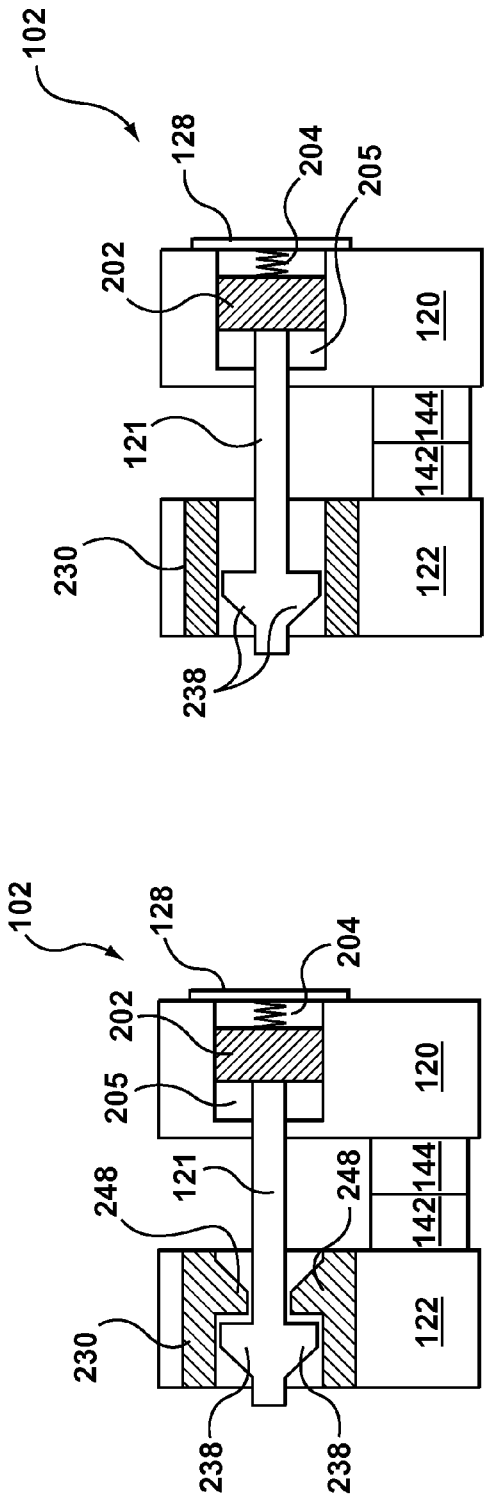
FIG. 10A
FIG. 10B
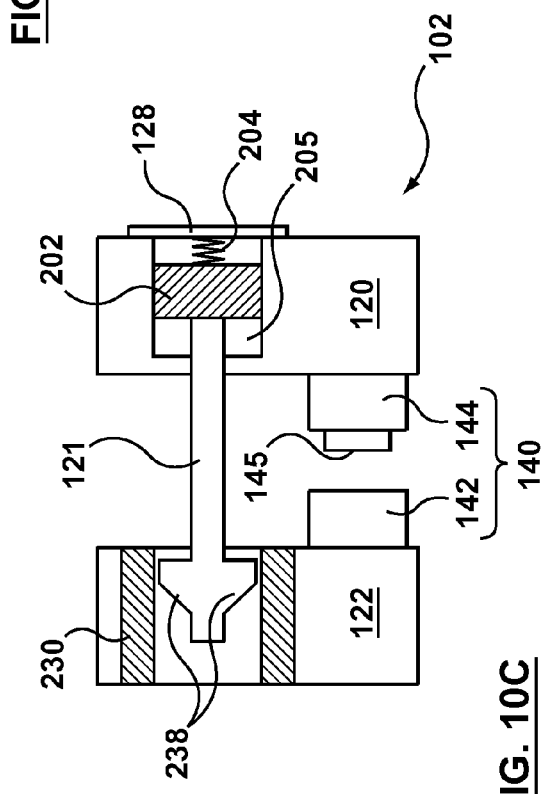
FIG. 10C

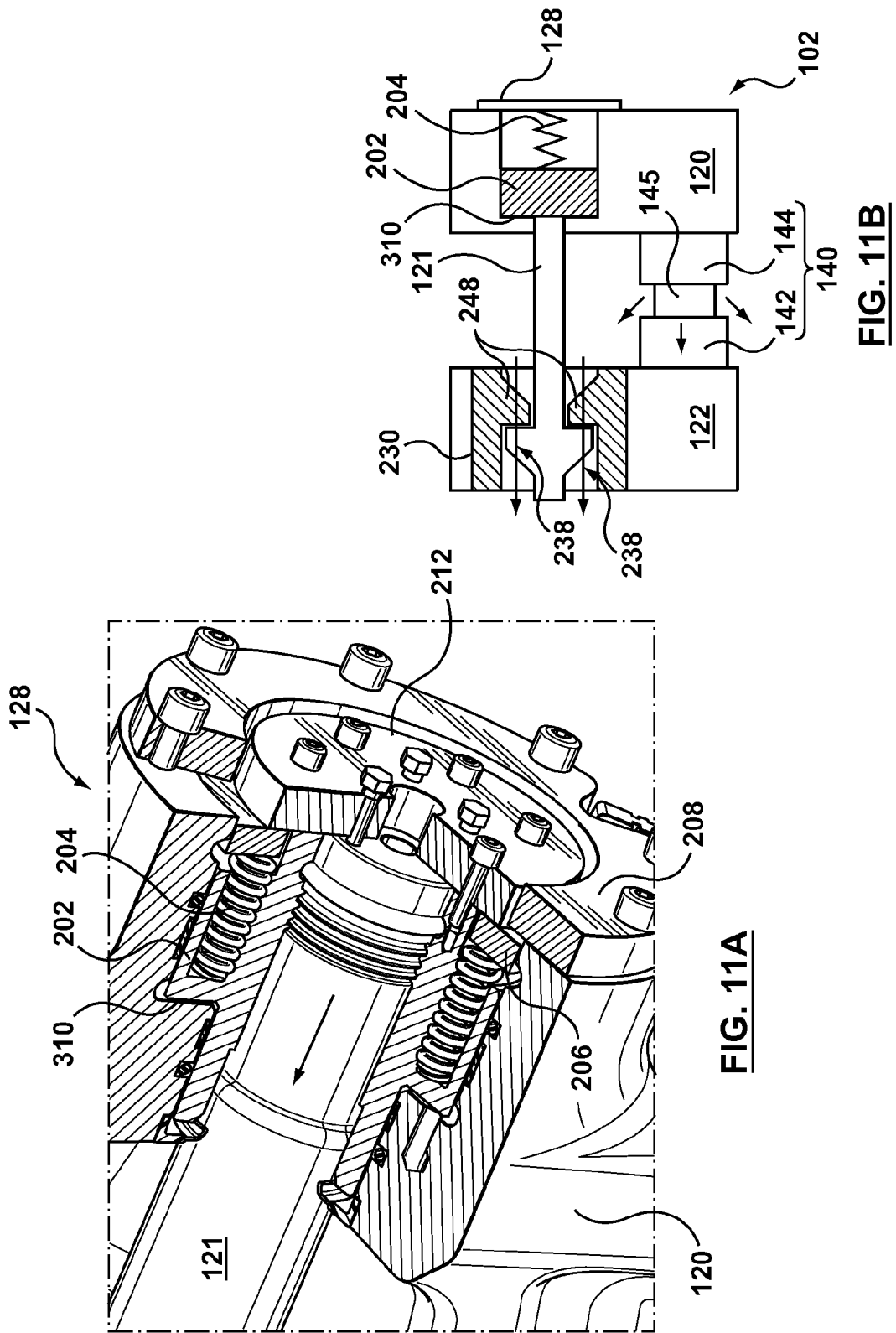

MOLDING-SYSTEM CLAMP

RELATED APPLICATIONS

Similar subject matter is disclosed in Applicant's related application entitled Molding-system Lock, (U.S. patent application Ser. No. 11/671,165 which was filed concurrently with the present application on 2007 Feb. 5.

TECHNICAL FIELD

The present invention generally relates to, but is not limited to, molding systems, and more specifically the present invention relates to, but is not limited to, (i) a clamp of a molding system, (ii) a molding system having a clamp, (iii) a method of a clamp of a molding system, (iv) a molded article manufactured by usage of a clamp of a molding system, (v) a molded article manufactured by usage of a molding system including a clamp, and (vi) a molded article manufactured by usage of a method of a clamp of a molding system.

BACKGROUND

Examples of known molding systems are (amongst others): (i) the HyPET™ Molding System, (ii) the Quadloc™ Molding System, (iii) the Hylectric™ Molding System, and (iv) the HyMet™ Molding System, all manufactured by Husky Injection Molding Systems (www.husky.ca).

U.S. Pat. No. 4,029,457 (Inventor: Yamamoto; Published: 1977 Jun. 14) discloses a molding machine of the type where a movable die plate carrying a movable mold is moved toward a stationary mold. The movable die plate is locked, by a locking member, to the tie bars. Then the mold-tightening cylinder is operated to strongly urge the movable mold against the stationary mold. The locking member is operated by an electric actuator before the movable mold engages the stationary mold, or while the movable die plate is still being moved toward the stationary mold.

U.S. Pat. No. 5,211,970 (Inventor: Sakurai et al; Published: 1993 May 18) discloses a hydraulic clamping apparatus for use with injection molding machines. The clamping apparatus includes (i) a first hydraulic actuator having a first cylinder and (ii) a first hollow, cup-shaped piston with a closed head portion disposed for reciprocating movement within the first cylinder, (iii) a foot portion axially spaced from the head portion and defining an opening, (iv) a second hydraulic actuator having a second piston, (v) a rod extending axially through the opening into the first piston and connected between the first and second pistons, (vi) a second cylinder mounted for reciprocating movement on the second piston and through the opening between a recessed position substantially within the first piston and an extended position substantially outside the first piston, and (vii) a clutch operable in the extended position of the second cylinder to produce engagement thereof with the first piston. The overall length of the apparatus is minimized by placement of the second actuator cylinder within the first piston.

U.S. Pat. No. 5,320,517 (Inventor: Hirata et al; Published: 1994 Jun. 14) discloses a clamping system for a molding press that has: (i) a moving plate with clamping cylinders each with a bore to take a rod attached to a piston, and (ii) a compensator device between two oil chambers. More specifically, a clamping apparatus of a molding machine is disclosed that includes: (i) a base, (ii) a fixed board disposed on the base, (iii) a movable board movable relative to the fixed board, (iv) a plurality of mold clamping cylinders disposed in predetermined positions of the fixed board, the mold clamping cylinders each having a mold clamping piston with a tie bar reception hole and a tie bar connection device disposed on the mold clamping piston, (v) a plurality of tie bars with a thread at their one end, the tie bars being disposed in correspondence with the mold clamping cylinders on the movable board, (vi) a plurality of mold opening/closing cylinders for moving the movable board, and (vii) an axially movable sleeve associated with each clamping cylinder for adjusting an axial position of an associated piston to adjust an engagement position of the tie bar connection device. The sleeve is disposed in an opening in the fixed board and forms an extension of the tie bar reception hole, with one end of the sleeve abutting against a reception wall provided in each piston surrounding the tie bar reception hole. The other end of the sleeve threadably cooperates with an engagement adjustment screw ring that is secured to the fixed board.

U.S. Pat. No. 5,338,171 (Inventor: Hayakawa et al; Published: 1994 Aug. 16) discloses a mold clamping device with an aligning device that includes a fixed die plate with mold clamping hydraulic cylinders, and hollow pistons and tie-bars, connected through an aligning mechanism. More specifically, a molding apparatus is disclosed with die-clamping and alignment devices that has: (i) a stationary die plate for holding a stationary die, (ii) a movable die plate for holding a movable die, (iii) a device for moving (forward and rearward) the movable die plate with respect to the stationary die plate, (iv) a fastening device for fastening the movable die plate and the tie bar to each other by hydraulic force when the stationary die and the movable die have been approached to predetermined positions, (v) a tie bar for clamping the movable die and the stationary die by die-clamping force generated by a die-clamping cylinder, and (vi) a primary alignment mechanism provided for at least one junction among junctions between a piston of a die-clamping hydraulic cylinder and the tie bar, between a support plate and the tie bar, and between the movable die plate and a movable die plate support member, in order to permit the two dies to be aligned to each other by a secondary position alignment function, such as a guide pie for aligning the two dies at the time of clamping the dies.

U.S. Pat. No. 5,439,369 (Inventor: Wang; Published: 1995 Aug. 8) discloses a mold-locking device for an injection molding machine. The device includes a stationary disc and a movable disc displaceable to lock a mold placed between the stationary disc and the movable disc. Four oil cylinders are provided to move the movable disc on four guide rods back and forth. Four push rods are provided, each having a front end secured to the movable disc and a rear end extending through four cylindrical tubes disposed with a respective one of four holes formed in a support disc. A piston disposed within a piston chamber formed in a front surface of the support disc is pushed forward to respectively push a shield plate. The shield plate displaces the four push rods so as to push the movable disc with a great force, after the movable disc has been pushed forward to lock the mold stably.

U.S. Pat. No. 5,645,875 (Inventor: Glaesener et al; Published: 1997 Jul. 8) discloses a securing/clamping assembly for clamping platens of an injection molding machine. The assembly includes a mechanism for guiding the platens and a body member having a structure which is movable as a single unit. The body member is adapted to be attached with at least one of the platens and includes a mechanism for securing the mechanism for guiding and for conveying a clamping force to the platens for clamping the platens during injection molding. The mechanism for securing includes an engagement mechanism for placing the mechanism for securing into and out of locking engagement with the mechanism for guiding, such that when the engagement mechanism is out of locking engagement with the mechanism for guiding, the body member and the mechanism for guiding are relatively movable.

U.S. Pat. No. 5,868,989 (Inventor: Glaesener; Published: 1999 Feb. 9) discloses a securing/clamping assembly for clamping platens of an injection molding machine, which includes: (i) a mechanism for guiding the platens, and (ii) a body member that has a structure which is movable as a single unit. The body member is adapted to be attached with at least one of the platens, and includes a mechanism for securing the mechanism for guiding and for conveying a clamping force to the platens for clamping the platens during injection molding. The mechanism for securing includes an engagement mechanism for placing the mechanism for securing into and out of locking engagement with the mechanism for guiding, such that when the engagement mechanism is out of locking engagement with the mechanism for guiding, the body member and the mechanism for guiding are relatively movable.

U.S. Pat. No. 5,776,516 (Inventor: Armbruster et al; Published: 1998 Jul. 7) discloses a two-platen injection molding machine with a stationary mold carrier plate and a movable mold carrier plate which are connected via tie bars having piston-cylinder units which build up and cancel the clamping force. At least one driving cylinder is arranged at the carrier plates for quick driving movement thereof. The tie bars are constructed as loose clamping pins forming the piston rod of the piston-cylinder units. The tie bars are guided through the movable mold carrier plate and the stationary mold carrier plate, and have a hydraulic high-pressure closing unit and a quick-locking mechanism mounted thereon external to the mold carrier plates. Elements are provided which detect the position of the movable mold carrier plate in a defined manner and control the quick-locking mechanism, the closing unit, and the driving cylinder.

U.S. Pat. No. 5,922,372 (Inventor: Schad; Published: 1999 Jul. 13) discloses a securing/clamping system for use with platens of a molding machine, which includes: (i) a stationary platen having a first mold half affixed thereto, (ii) a movable platen having a second mold half affixed thereto (the movable platen travels along a plurality of tie bars, and reciprocatively moves between a mold open and mold closed position), and (iii) a system for applying a clamping force to the movable platen.

U.S. Pat. No. 6,093,361 (Inventor: Schad; Published: 2000 Jul. 25) discloses stationary and movable platens that have mold halves affixed thereto. The movable platen is reciprocatingly moved between a mold open and a mold closed position, and a clamping force is applied to the movable platen in the mold closed position, and a mold break force is applied to the movable platen in the mold closed position. At least one column is provided having a first end affixed to the movable platen, and a threaded rod engages a threaded member which is operatively connected to the column.

U.S. Pat. No. 6,120,724 (Inventor: Glaesener; Published: 2000 Sep. 19) discloses a mold stroke force that is applied to the movable platen to move the movable platen between a mold open position and a mold closed position and from the mold closed to the mold open position. A mold break force is applied to the movable platen in the mold closed position to break open the mold. The mold stroke cylinder for applying a mold stroke force acts inside the mold stroke cylinder for applying a mold break force.

U.S. Pat. No. 6,241,509 (Inventor: Galt et al: Published: 2001 Jun. 5) discloses a tie bar construction for low tonnage injection molding machine requiring less parts and providing more space. A stationary platen and a movable platen movable with respect to the stationary platen from a closed position in clamping engagement with the stationary platen to an open position spaced from the stationary platen. At least two tie bars are provided connecting the stationary platen to the movable platen, and a stroke cylinder within each tie bar operative to move the platens from an open to closed position and from a closed to open position. Clamping means are provided to clamp the platens together in the closed position, and including means carried by the tie bars to engage the clamping means.

U.S. Pat. No. 6,533,573 (Inventor: Tamaki et al; Published: 2003 Mar. 18) discloses a mold clamping apparatus for an injection molding machine includes a stationary platen fixedly holding the stationary mold, a movable platen fixedly holding the movable mold and disposed opposite to the stationary platen, tie bars for guiding the movable platen for movement toward and away from the stationary platen, a movable platen driving mechanism for moving the movable platen along the tie bars to close and open the mold, a movable platen fixing mechanism for fixing the movable platen to the tie bars at a set position immediately before a position where the movable mold is joined to the stationary mold, and a clamping force applying mechanism including sealed hydraulic cylinder actuators capable of converting energy of a hydraulic fluid into an intensified mold clamping force and of applying the intensified mold clamping force to the stationary platen. In one embodiment, a rear plate located behind the movable platen carries a hydraulically driven ram support and clamping ram, and the ram support has a piston portion that is carried in a cylinder bore in the rear plate. The ram hydraulically clamps the mold closed after the movable platen is electrically driven to bring the mold halves together.

U.S. Pat. No. 6,767,204 (Inventor: Fuller; Published: 2004 Jul. 27) discloses an interlock for a column that includes a piston with a piston rod, such that the piston rod is disposed in a claw bush. The claw bush is disposed in a single- or multi-part plate, such that the piston and the claw bush can move in the single- or multi-part plate. In one embodiment, the claw bush has at least two stages, to apply the force in a distributed manner, the contour of the stages corresponding to the end of the piston rod and/or to the end of the column, the average radius of the first stage differing from the average radius of the second stage.

U.S. Pat. No. 6,811,388 (Inventor: Kitayama et al; Published: 2004 Nov. 2) discloses a mold clamping unit employed in an injection molding apparatus for opening and closing a mold having a movable mold plate and a fixed mold plate. The mold clamping unit includes a mold clamping cylinder, mold opening means for applying a mold opening force of a predetermined magnitude to the movable mold plate in the direction from the closed position to the fully open position and moving the movable mold plate from the closed position to the predetermined half-open position located between the closed position and fully open position, and switching means for switching the mold clamping force generated by the mold clamping cylinder between the first mold clamping force which is larger than the mold opening force and a second mold clamping force which is smaller than the mold opening force by switching the supply pressure of working fluid supplied to the mold clamping cylinder. In such a configuration, special mold opening means for moving the movable mold plate from the closed position to the half-open position is provided separately in addition to the mold clamping cylinder. As a result, the movable mold plate can be accurately moved to the half-open position.

U.S. Pat. No. 6,893,250 (Inventor: Meschia et al; Published: 2005 May 17) discloses an injection molding machine including a fixed mold half mounted on a fixed plate integral with the machine frame and a moveable mold half mounted on a moveable plate supported in translation on the machine frame and guided along guide columns integral with the fixed plate, to pass from a mold closing position to a mold opening position, and a closing and clamping system including clamping means, integral with the moveable plate and acting on a portion of the guide columns to lock the moveable plate in the closing position. The clamping means includes a plurality of locking inserts mounted slidably within seats of a body integral with the moveable plate to pass from a non clamping position to a clamping position in which they act, in a locking relationship, on the guide columns, each locking insert having a circular hole to receive an eccentric shaft in an eccentric position, so that rotation of the eccentric shaft causes translation of the insert, drive means being provided such as to set the eccentric shafts in rotation synchronously to allow opening/closing of the clamping means.

U.S. Pat. No. 6,945,765 (Inventor: Roetzel; Published: 2005 Sep. 20) discloses a clamp that includes a tie-bar which extends between a fixed and a movable platen of a molding machine, with respect to the first, and hydraulically operated locking means for engaging the tie bar and generating the clamping force. The locking means includes a hydraulic cylinder having a hollow sleeve and piston provided with internal toothings, in axially spaced apart positions. The sleeve and piston unit is made to rotate and slide axially, to selectively engage and disengage with the toothed head at the end of the tie bar to allow step and fine adjustments of the position of the movable platen, in relation to the thickness of the mold.

United States Patent Application Number 2005/0287246 (Inventor: Looije; Published: 2005 Dec. 29) discloses a clamp piston assembly that includes a body portion in which a pocket is provided. The pocket is arranged to receive an insert in the form of a rotatable clamp bushing. Sets of blades or wear pads are positioned on both an internal surface of the pocket and the external surface of the clamp bushing and cooperate to form sealable chambers that extend about the circumference of the clamp bushing. These chambers are in fluid communication with suitable processor-controlled valves and hydraulic or pneumatic pumps that operative to purge and inject fluid from and into the chambers. Pressurized fluid acting within selected chambers causes rotation of the clamp bushing. The insert also contains a row of teeth arranged to selectively engage corresponding teeth in a tiebar. The clamp bushing is hence independently rotatable from its surrounding body that, in use, is mechanically attached to an injection molding machine.

European Patent Number 1,287,967 (Fuller et al; Published 2003 Mar. 05) discloses a locking system for a column or tie bar of an injection molding machine. The locking system includes a bush with internal steps shaped to correspond with the tie bar end.

Great Britain Patent Number 1,601,419 (Assignee: Warnke Umformtech; Published: 28 Oct. 1981) discloses a mold closing and locking arrangement in an injection molding machine having two mold mounting platens. One of the platens is guided on the machine bed and is movable with respect to the other platen in the closing direction and the opening direction of the mold. Working cylinder/piston units are used to bring together and separate the two mold mounting platens. A locking device is used which causes the two mold mounting platens to be clamped together in the closed position. An apparatus is also disclosed for generating the closing force and the clamping force.

SUMMARY

According to a first aspect of the present invention, there is provided a clamp of a molding system having a rod, the clamp including: (i) a first actuator configured to be interactable with the rod, and (ii) a second actuator configured to be interactable with the first actuator.

According to a second aspect of the present invention, there is provided a molding system, having: (a) a rod, and (b) a clamp including: (i) a first actuator configured to be interactable with the rod, and (ii) a second actuator configured to be interactable with the first actuator.

According to a third aspect of the present invention, there is provided a molding system, having: (a) platens being movable relative to each other, (b) rods extending between the platens, (c) locks supported by a selected platen of the platens, each of the locks being lockably and unlockably engageable with a selected rod of the rods, and (d) clamps supported by a preferred platen of the platens, each of the clamps including: (i) a first actuator interactable with a respective rod, and (ii) a second actuator interactable with the first actuator.

According to a fourth aspect of the present invention, there is provided a method of a clamp of a molding system having a rod, the method including: (i) interacting a first actuator with the rod, and (ii) interacting a second actuator with the first actuator.

According to a fifth aspect of the present invention, there is provided a method of a molding system, the method including: (i) configuring platens to be movable relative to each other, (ii) extending rods between the platens, (iii) supporting locks by a selected platen of the platens, each of the locks being lockably and unlockably engageable with a selected rod of the rods, (iv) supporting clamps by a preferred platen of the platens, each of the clamps including: (i) a first actuator and (ii) a second actuator, (v) interacting the first actuator with the rod, and (ii) interacting the second actuator with the first actuator.

According to a sixth aspect of the present invention, there is provided a molded article manufactured by usage of a clamp of a molding system having a rod, the clamp including: (i) a first actuator configured to be interactable with the rod, and (ii) interacting a second actuator with the first actuator.

According to a seventh aspect of the present invention, there is provided a molded article manufactured by usage of a molding system, including: (a) a rod, and (b) a clamp including: (i) a first actuator configured to be interactable with the rod, and (ii) a second actuator configured to be interactable with the first actuator.

According to an eighth aspect of the present invention, there is provided a molded article manufactured by usage of a molding system, including: (a) platens being movable relative to each other, (b) rods extending between the platens, (c) locks supported by a selected platen of the platens, each of the locks being lockably and unlockably engageable with a selected rod of the rods, and (d) clamps supported by a preferred platen of the platens, each of the clamps including: (i) a first actuator interactable with a respective rod, and (ii) a second actuator interactable with the first actuator.

According to a ninth aspect of the present invention, there is provided a molded article manufactured by usage of a method of a clamp of a molding system having a rod, the method including: (i) interacting a first actuator with the rod, and (ii) interacting a second actuator with the first actuator.

A technical effect, amongst other technical effects, of the aspects of the present invention is improved operation of molding systems.

DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which (briefly):

FIGS. 5A, 5B, 5C depict views of a lock 130 of the clamp assembly 102 of FIG. 2A according to a third exemplary embodiment in which the lock 130 is placed in an unlocked condition;

FIGS. 7A, 7B depict views of the clamp 128 of the clamp assembly 102 of FIG. 2A in which the clamp 128 is positioned in a gap closed condition;

FIGS. 8A, 8B depict views of the clamp 128 of the clamp assembly 102 of FIG. 2A in which the clamp 128 is actuated;

FIGS. 10A, 10B, 10C depict views of the clamp assembly 102 of FIG. 2A in which the clamp assembly 102 is placed in a post mold break condition; and FIG. 11A, 11B depicts views of the clamp assembly 102 of FIG. 2A in which the clamp assembly 102 is placed in a mold flash condition.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
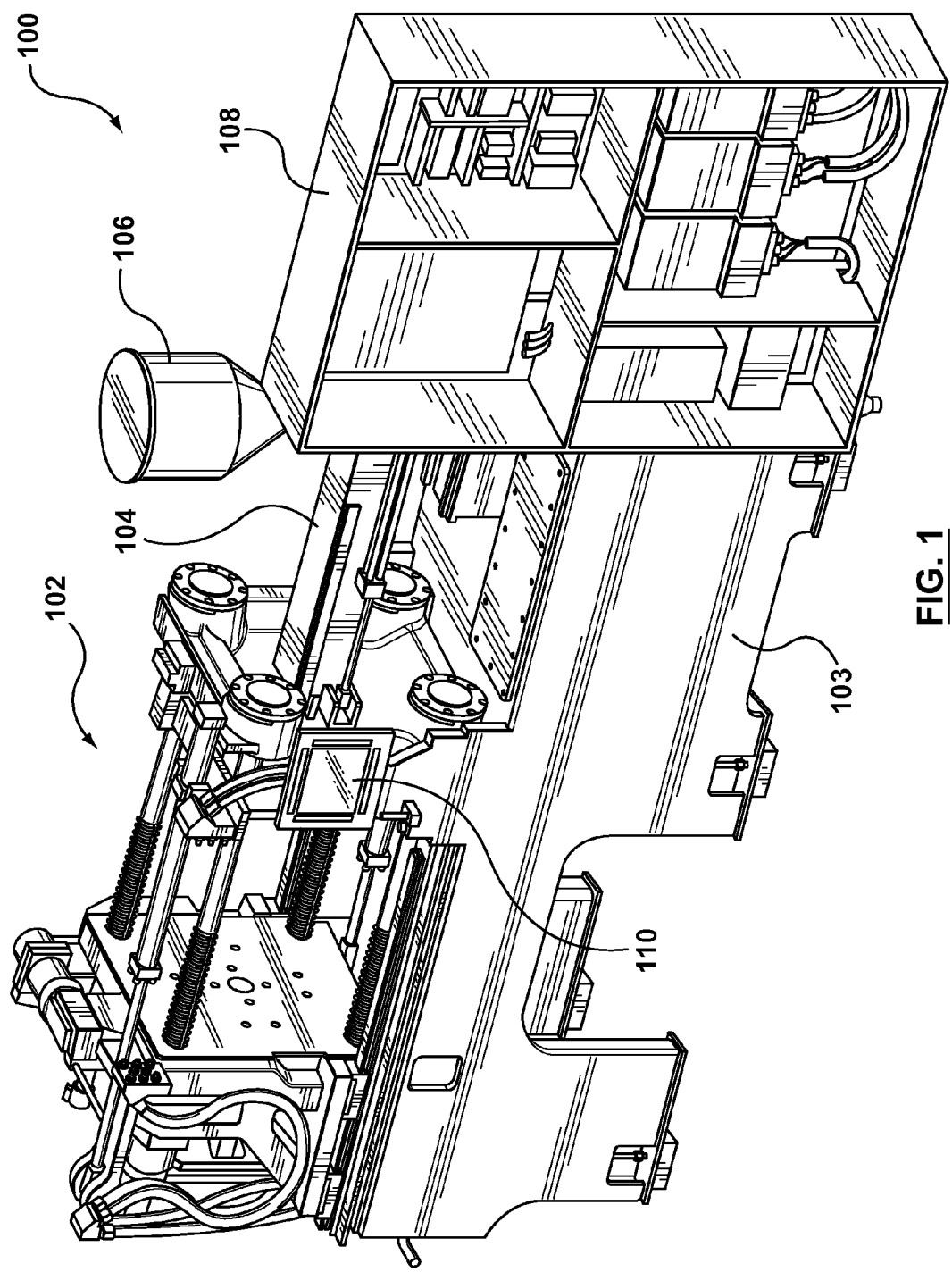
FIG. 1 depicts a perspective view of a molding system 100 according to the first exemplary embodiment.

FIG. 1 depicts the perspective view of the molding system 100 (preferably, an injection molding system, hereafter referred to as the "system 100") according to the first exemplary embodiment. The system 100 includes components and/or processes that are known to persons skilled in the art and are, therefore, not described in the instant description; these known components/components are described, at least in part, in the following references (by way of example): (i) *Injection Molding Handbook by Osswald/Turng/Gramann* (ISBN: 3-446-21669-2; publisher: Hanser), and/or (ii) *Injection Molding Handbook by Rosato and Rosato* (ISBN: 0-412-99381-3; publisher: Chapman & Hill). The new components and/or new arrangements associated with the system 100 are described hereafter. Preferably, the system 100 includes, but is not limited to: (i) a clamp assembly 102, (ii) an extruder 104, (iii) a frame 103, and (iv) a control cabinet 108. The clamp assembly 102 and the extruder 104 are supported by the frame 103. The extruder 104 is coupled to a mold cavity defined by a mold (not depicted in FIG. 1) that is held by the clamp assembly 102. The extruder 104 may be: (i) a reciprocating-screw (RS) extruder, or (ii) a two-stage extruder that has a shooting pot configuration. A hopper 106 is: (i) coupled to a feed throat of the extruder 104, and (ii) is configured to feed pellets of a molding material into a feed throat of the extruder 104. The extruder 104 has (by way of example): (i) the feed throat that receives the pellets from the hopper 106, (ii) an output section that is coupled to the mold cavity of the mold, (iii) a barrel and a screw disposed in the barrel in which the screw is operated so as to: (a) process the pellets into an injectable molding material, and (b) inject, under pressure, the injectable molding material into the mold cavity of the mold while the clamp assembly 102 applies and maintains a clamping force (not depicted) that maintains the mold shut closed as the mold receives the molding material under pressure. Typically, a check valve is: (i) attached to the distal end of the screw, and (ii) used to collect a shot of the injectable molding material in an accumulation zone of the barrel of the extruder 104. Typically, the mold is sold separately from the system 100, and since the mold wears with usage, it is replaced, from time to time, with either a new mold or a refurbished mold. The control cabinet 108 is: (i) attached to the frame 103, and (ii) configured to house control equipment that is used to automatically control and/or monitor operations of controllable components of the system 100. A human machine interface 110 (hereafter referred to as the "HMI 110") is operatively coupled to the control equipment. An operator uses the HMI 110 to direct the control equipment to monitor and/or control operations of the system 100 as may be required to mold articles in a mold cavity defined by the mold.

Figure 2:
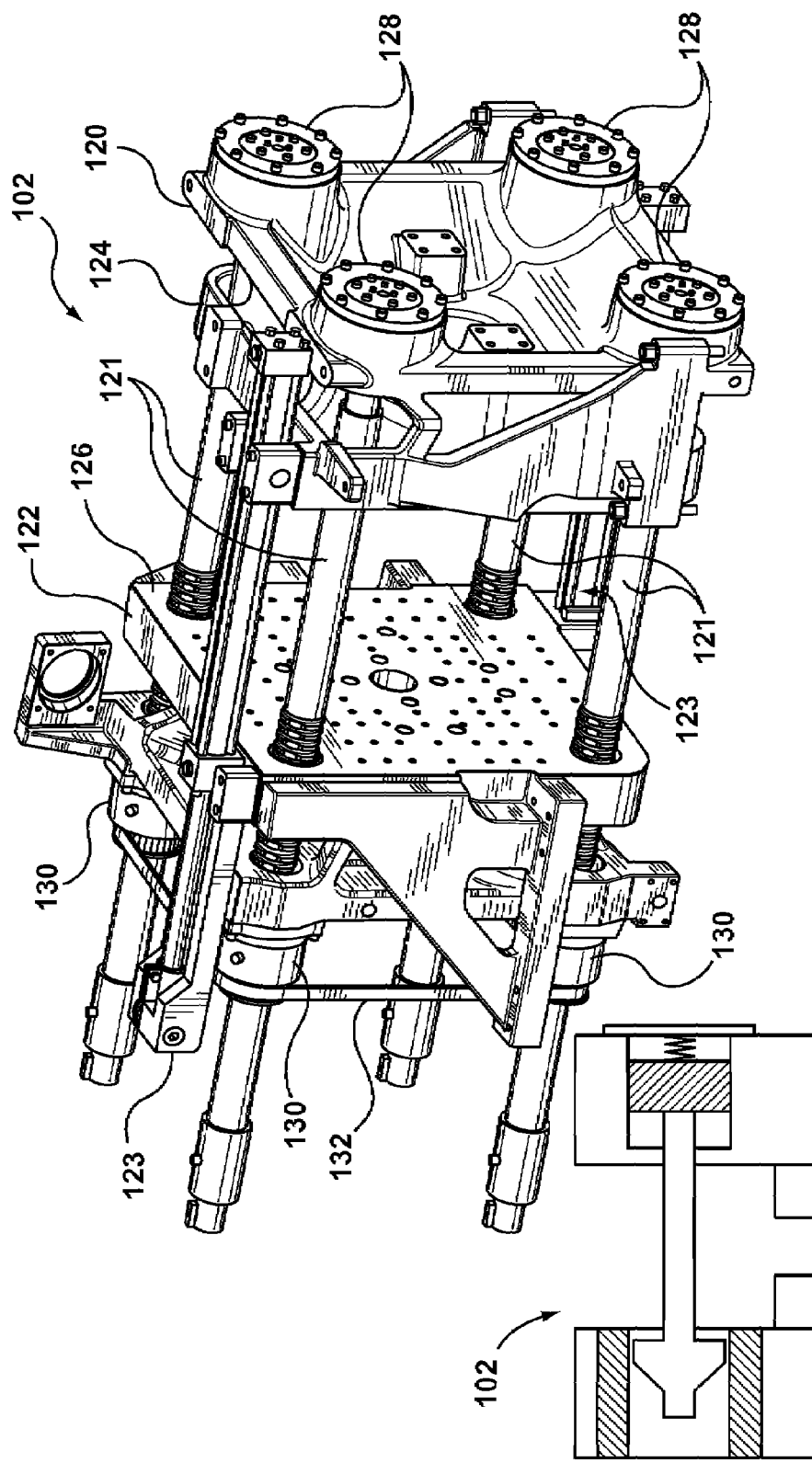
FIGS. 2A, 2B depict views of a clamp assembly 102 of the molding system 100 of FIG. 1 according to the first exemplary embodiment in which the clamp assembly 102 is placed in a mold opened position.

FIG. 2A depicts the perspective view of the clamp assembly 102 of the system 100 of FIG. 1 according to the first exemplary embodiment. The clamp assembly 102 is depicted in the mold opened position; that is, the mold portions of the mold are separated from each other. The mold is not depicted in FIG. 2A, but is depicted in FIG. 2B. The clamp assembly 102 includes a stationary platen 120 (hereafter referred to as the "platen 120"), (ii) a movable platen 122 (hereafter referred to as the "platen 122"), (iii) platen stroke actuators 123, (iv) clamp actuators 128 (hereafter referred to as the "clamps 128"), (v) rods 121 (the rods 121 may be referred to as the "tie bars"), and (vi) tie-bar lock mechanisms 130 (hereafter referred to as the "locks 130"). The platen 120 is fixedly attached to the frame 103. The platen 122 is: (i) slidably supported by the frame 103, and (ii) linearly, slidably moveable relative to the platen 120. The platen 120 includes a mold support structure 124 that is configured to support a stationary mold portion of the mold. The platen 122 includes a movable mold support structure 126 that is configured to support a movable mold portion of the mold. The platen stroke actuators 123 each have end portions, in which: (i) a first end portion is connected to the platen 120 (or alternatively connected to the frame 103), and (ii) a second portion is connected to the platen 122; preferably, the platen stroke actuators 123 are located at opposite respective corners of the platens 120, 122; however, other arrangements may be used.

The platen stroke actuators 123 are used to linearly stroke the platen 122 relative to (that is, toward and away from) the platen 120 so as to close and open the mold portions of the mold. When the mold portions of the mold are closed against each other, the mold portions define a mold cavity in which a molded article may be molded (manufactured) once the extruder 104 injects, under pressure, the injectable molding material into the mold cavity. The clamps 128 are mounted to (or supported by) respective corners of the platen 120. The rods 121 are coupled to and extend from respective clamps 128. The rods 121 extend over to and are lockably interactable with respective locks 130 that are mounted to (or supported by) respective corners of the platen 122. The locks 130 are used to selectively lock and unlock their respective rod 121 relative to their respective corner of the platen 122. A lock actuator 132 includes, preferably: (i) an electric motor, and (ii) a belt that is drivable by the electric motor. The electric motor drives the belt, which in turn, rotatably actuates the locks 130 between a locked positioned and an unlocked position. Preferably, movement of the locks 130 is synchronized so that each lock 130 (substantially) simultaneously locks and unlocks so as to reduce cycle time of the system 100. The clamps 128 are used to apply a clamping force to the mold via the platens 120, 122 and the rods 121 after: (i) the platen 122 is stroked so as to close the mold, and (ii) the rods 121 have been locked to the platen 122. The clamping force, once actuated and applied to the rods 121 and the platens 120, 122, maintains the mold portions shut tight against each other as the mold cavity is quickly filled, under pressure, with the injectable molding material.

FIG. 2B depicts the cross-sectional schematic view of the clamp assembly 102 of FIG. 2A along the longitudinal axis of the clamp assembly 102. The clamp assembly 102 is in the mold opened position. A mold 140 includes: (i) a stationary mold portion 144 that is mounted to and supported by the platen 120, and (ii) a moveable mold portion 142 that is: (a) supported by the platen 122, and (b) movable relative to the stationary mold portion 144 (that is, once the platen 122 is stroked relative to the platen 120) so as to open and close the moveable mold portion 142 relative to the stationary mold portion 144. Once the moveable mold portion 142 and the stationary mold portion 144 are brought together and are made to abut each other, the moveable mold portion 142 and the stationary mold portion 144 define, in combination, a mold cavity.

Figure 3:
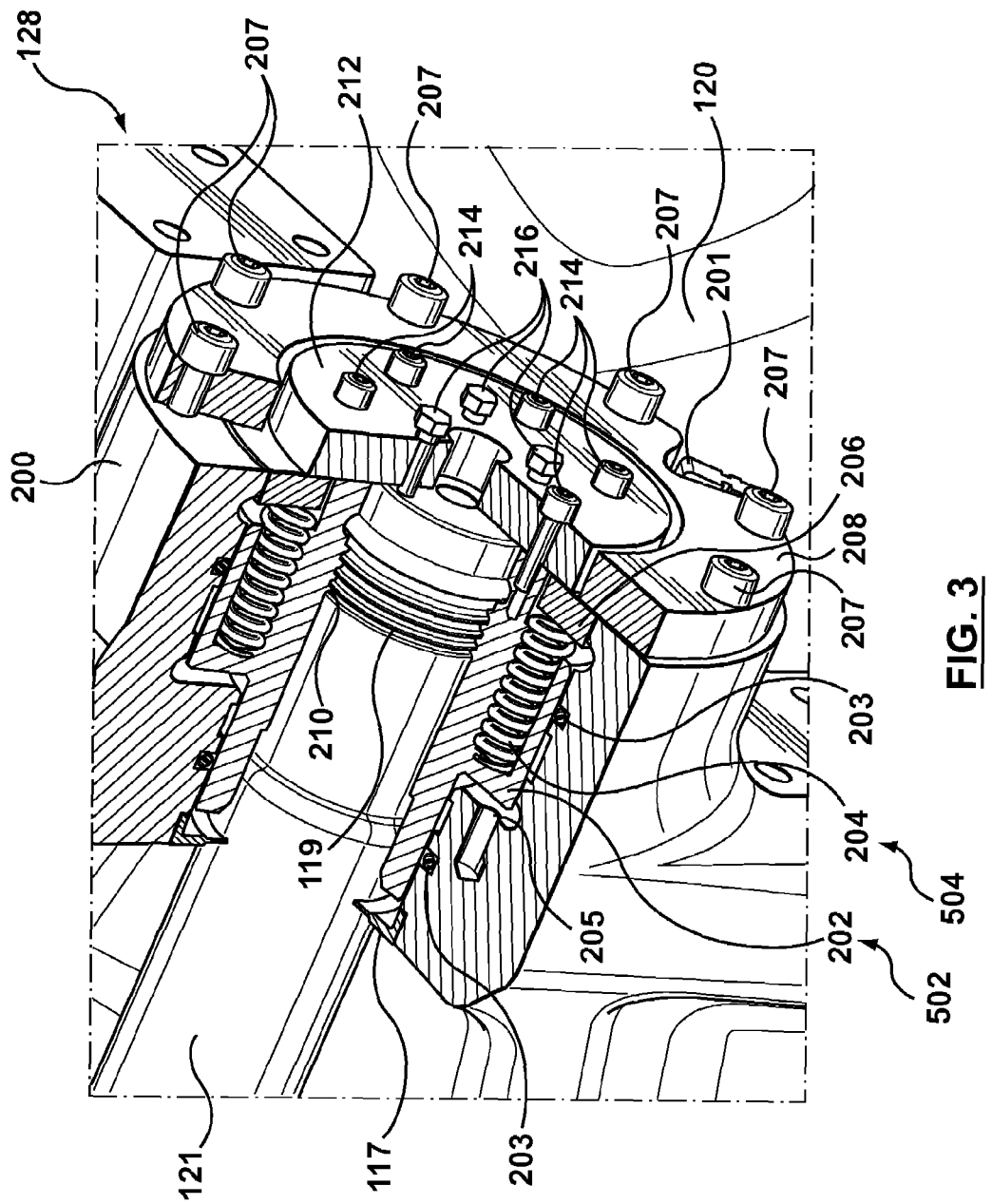
FIG. 3 depicts a perspective view of a clamp 128 of the clamp assembly 102 of FIG. 2A according to a second exemplary embodiment (which is the preferred exemplary embodiment) in which the clamp 128 is depicted positioned in a home position.

FIG. 3 depicts the perspective view of the clamp 128 of the clamp assembly 102 of FIG. 2A according to the second exemplary embodiment. The clamp 128 is placed in the home position in which a clamping force is not applied by the clamp 128 to: (i) the platen 120, and (ii) the platen 122 (via the rods 121). The clamp 128 includes: (i) a first actuator 502, and (ii) a second actuator 504. The first actuator 502 is interactable with the rod 121. Specifically, after the rod 121 is locked to the platen 122 (by using the lock 130), the first actuator 502 is actuated so as to apply the clamping force to the rod 121, and in response the rod 121 becomes stretched, at least in part, and in this manner the clamping force is transmitted to: (i) the platen 120, and (ii) the rod 121, which in turn transmits the clamping force to the platen 122. The first actuator 502 is movable between the home position and the force application position. The second actuator 504 is interactable with the first actuator 502; specifically, the second actuator 504 is used to move the first actuator 502 from the force application position to the home position once the first actuator 502 has been deactivated; in this arrangement, once the first actuator 502 is deactivated, the second actuator 504 acts as a reset mechanism that resets the position of the first actuator 502 back to the home position. Once the actuator 502 is placed back in the home position, the lock 130 may be actuated so as to unlock the rod 121 from the platen 122.

Preferably, the second actuator 504 includes a spring 204 that is interactable with the first actuator 502; specifically, (i) once the actuator 502 is actuated to move from the home position toward the force application position, the first actuator 502 pushes against the spring 204 so that the spring 204 becomes compressed and thereby the spring 204 is made to store energy, and (ii) once the first actuator 502 has been deactivated, the spring 204 releases its stored energy and pushes the first actuator 502 from the force application position toward the home position. In this manner, the spring 204 biases the first actuator 502 toward the home position. Preferably, the first actuator 502 includes: (i) a clamp housing 200 (hereafter referred to as the "housing 200"), (ii) a piston 202, (iii) a reset plate 206, (iv) a piston stop plate 208, and (v) a reset stop 212. The piston 202 is fixedly attached (coupled) to a distal end of the rod 121; specifically, the piston 202 includes piston threads 210 that threadably engage rod threads 119 of the rod 121. After: (i) the movable mold portion 142 and the stationary mold portion 144 are closed against each other, and (ii) each of the rods 121 have been locked to the platen 122 (each lock 130 is lockably and unlockably engageable with a selected or respective rod 121), movement of the piston 202 (along the longitudinal axis of the rod 121 and away from the platen 122) causes the rod 121 to become stretched. The piston 202 defines, preferably, a recess that receives the spring 204. The piston 202 defines, more preferably, a plurality of recesses, each of which receives a respective spring 204; specifically, the recess is aligned: (i) parallel to the rod 121, (ii) axially offset from the rod 121, (iii) so as open toward the outer side of the platen 120, and (iv) so as to open along a direction that faces away from the platen 122. The housing 200 is integrated (or coupled) to the platen 120; the housing 200 is configured to: (i) receive the piston 202 along with the spring 204 that is received in the recess of the piston 202, (ii) receive, at least in part, the rod 121, and (iv) accommodate sliding movement of the piston 202 and the rod 121 along the longitudinal axis of the rod 121. A combination of: (i) the piston 202, (ii) the housing 200, and (iii) the rod 121 defines a chamber 205. The chamber 205 is configured to receive a pressurizable fluid (hereafter referred to as the "fluid"), and once the fluid is pressurized, the fluid abuttably moves the piston 202. The fluid, under pressure, is used to move the piston 202 so that the piston 202 moves away from the platen 122 in the direction that extends along the longitudinal axis of the rod 121 toward the platen 120. A fluid input 201 communicates the fluid into and out from the chamber 205. The fluid input 201 is coupled to a hydraulic circuit. The hydraulic circuit is not depicted, and is not within the scope of the exemplary embodiments. The hydraulic circuit is used to control flow and pressure of the fluid into and out from the chamber 205. The piston stop plate 208 is attached to the entrance of the housing 200 by bolts 207. The reset stop 212 is: (i) attached to an end portion of the piston 202 by bolts 214, and (ii) attached to the end face of the rod 121 by bolts 216. The reset stop 212 extends radially from the rod 121 toward the piston stop plate 208 so that a gap exists between the reset stop 212 and the piston stop plate 208 The reset plate 206 abuts: (i) the reset stop 212, (ii) the spring 204, and (iii) the piston stop plate 208; the reset plate 206 is placed between the spring 204 and the piston stop plate 208. The reset plate 206 is, preferably, free-floating. Piston seals 203 are used to seal the chamber 205 so as to: (i) prevent inadvertent leakage of the fluid from the chamber 205, and (ii) prevent dirt and debris from entering the chamber 205. It is preferred to place the piston seals 203 at locations as may be required. A rod seal 117 is placed between the rod 121 and the housing 200 so as to prevent dirt and debris from inadvertently entering the clamp 128.

In operation, responsive to actuating the first actuator 502, the rod 121 is driven from: the home position (in which the clamp force is not applied to the rod 121) to the force application position (in which the clamp force is applied to the rod 121). Responsive to pressurizing the chamber 205 with a relatively low amount of fluid pressure: (i) the fluid urges (to a degree) the piston 202 toward the spring 204 and away from the platen 122, and (ii) the spring 204 reacts to maintain the piston 202 at the home position. Responsive to pressurizing the chamber 205 with a relatively high amount of fluid pressure: (i) the fluid urges the piston 202 to move away from the platen 122 and along the housing 200 from the home position to the force application position in which the clamp force 506 is applied to the rod 121 (note that the clamp force is depicted in FIG. 8A as "clamping force 506"), and (ii) the spring 204 becomes compressed so as to store energy and thereby the spring 202 maintains the piston 202 in the force application position. Responsive to depressurizing the chamber 205 with the relatively low amount of fluid pressure, energy that is stored in the spring 204 becomes released so that the spring 204 moves or pushes the piston 202 from the force application position back to the home position.

Figure 4:
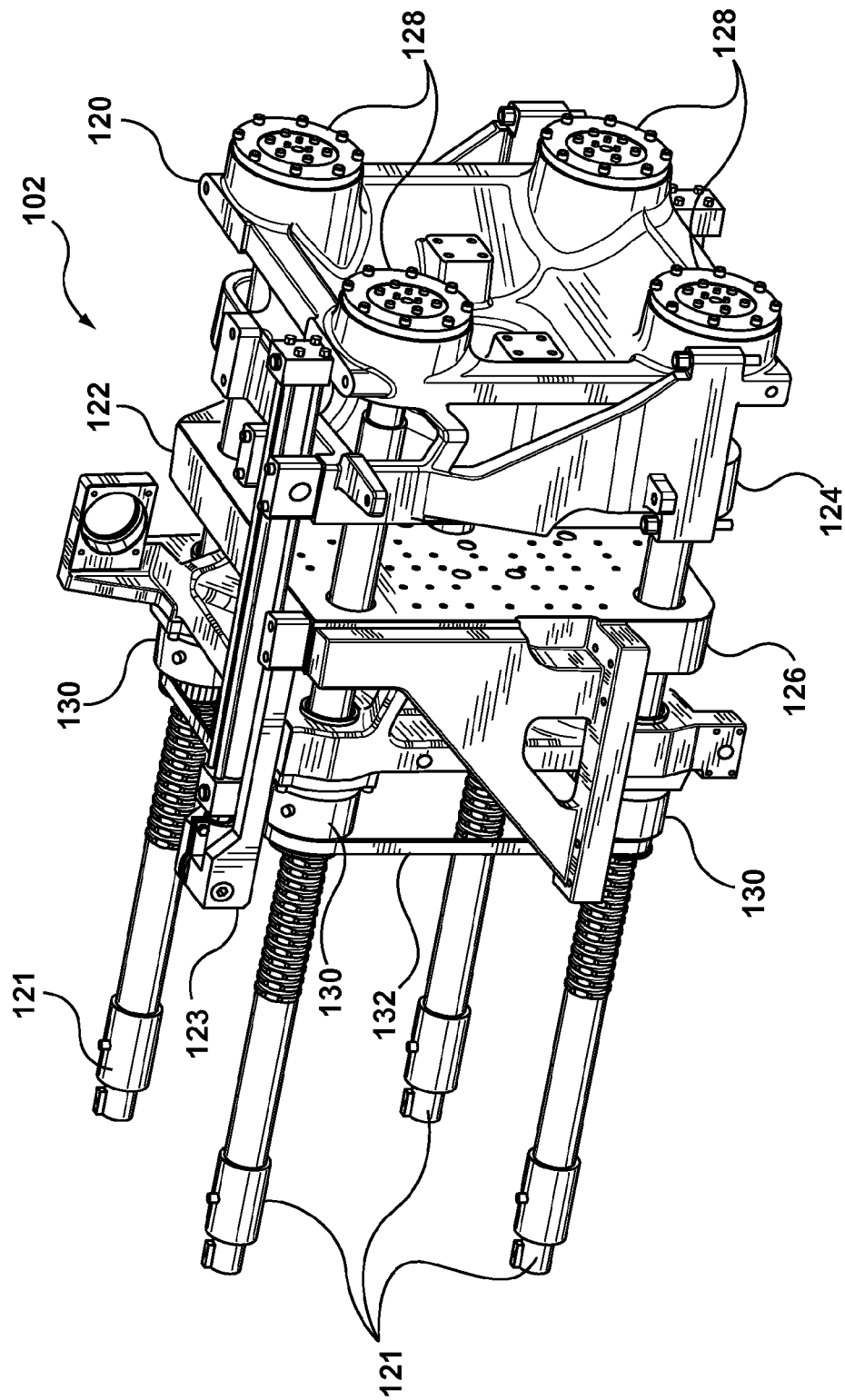
FIG. 4 depicts a perspective view of the clamp assembly 102 of FIG. 2A in which the clamp assembly 102 is placed in a mold closed position.

FIG. 4 depicts the perspective view of the clamp assembly 102 of FIG. 2A. The clamp assembly 102 is placed in the mold closed position. The platen 122 was moved relative to the platen 120 so as to close the mold portions of the mold 140 against each other. Specifically, the platen stroke actuators 123 were actuated so as to move the platen 122 towards the platen 120.

FIG. 5A depicts the perspective view of the lock 130 of the clamp assembly 102 of FIG. 2A according to the third exemplary embodiment. An example of the lock 130 is described and depicted in U.S. Pat. No. 5,868,989 (Inventor: Glaesener; Published: 1999-Feb.-9). The lock 130 is depicted as being placed in the unlocked condition. The lock 130 includes: (i) a lock member 510, and (ii) a complementary lock member 512. The complementary lock member 512 is engagable with the lock member 510. The lock member 510 is associated with the rod 121; specifically, the lock member 510 includes teeth structures 234 that have: (i) rows of rod-interrupted teeth 238 (hereafter referred to as the "teeth 238") that extend axially outward from the rod 121, and (ii) rod grooves 236 that extend through the teeth 238 and longitudinally along the rod 121. Preferably there are four rows of teeth 238 and four rows of the rod groove 236, and the rows of the teeth 238 and the rod grooves 236 are placed or positioned 90 degrees from each other. The complementary lock member 512 is associated with the platen 122; more specifically, the complementary lock member 512 is associated with a sleeve 230 that is rotatably mounted to the platen 122. The lock actuator 132 (not depicted in FIG. 5A) is coupled (by way of a belt interface 232) to the complementary lock member 512, and is used to rotate, preferably, the sleeve 230. Preferably, the sleeve 230 is rotatably coupled to a housing 264, and the housing 264 is fixedly attached to the platen 122 by way of bolts 265; in effect, the sleeve 230 is rotatable relative to the platen 122. The housing 264 includes threads 260 that are engageable with threads 262 of the sleeve 230 so that the sleeve 230 may be rotated relative to the housing 264. At the end of the sleeve 230 there is the belt interface 232 that interfaces (engages) with the belt of the lock actuator 132. Specifically, the complementary lock member 512 includes teeth structures 244 that have: (i) a row of sleeve-interrupted teeth 248 (hereafter referred to as the "teeth 248") that extend axially inward from the sleeve 230, and (ii) sleeve grooves 246 that extend along the teeth 248 and longitudinally along the inner part of sleeve 230. The teeth 248 are rotatably, lockably interactable with teeth 238.

FIG. 5B depicts the end view of the lock 130 of FIG. 5A. The lock 130 is placed in the unlocked condition. The teeth 248 and the teeth 238 are offset from each other so that: (i) the teeth 248 line up with the rod grooves 236, and (ii) the teeth 238 line up with the sleeve grooves 246. In this arrangement, the platen 122 (and the sleeve 230) is free to translate linearly in a direction that is aligned along the longitudinal axis of the rod 121. In the unlocked condition, the sleeve 230 and the rod 121 are unlocked relative to each other so that the platen 122 is free to translate relative to the platen 120.

FIG. 5C depicts the cross-sectional schematic view of the lock 130 along the longitudinal axis of the clamp assembly 102 of FIG. 2A. The clamp assembly 102 is placed in the mold closed position, and the lock 130 is placed in the unlocked condition.

Figure 6A:
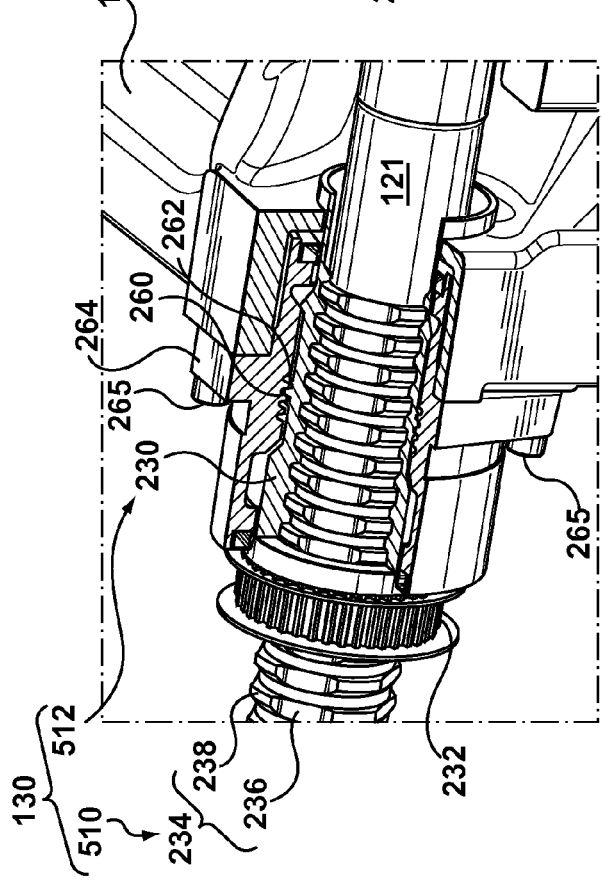
FIGS. 6A, 6B, 6C depict views of the lock 130 of FIG. 5A in which the lock 130 is placed in a lockable condition.

FIG. 6A depicts the perspective view of the lock 130 of FIG. 5A. The lock 130 is placed in the lockable condition; that is, the teeth 238, 248 are positioned relative to each other so that at a later cycle or stage of operation of the system 100, the teeth 238, 248 may be securely locked with each other. The sleeve 230 has been rotated so as to align the teeth 238 with teeth 248. In this condition: (i) a gap exists between the teeth 238 and the teeth 248, and (ii) the teeth 238 and the teeth 248 do not touch (or frictionally interfere with) each other as they are aligned relative to each other, and this arrangement prevents inadvertent wearing of the teeth 238, 248.

Figure 6B:
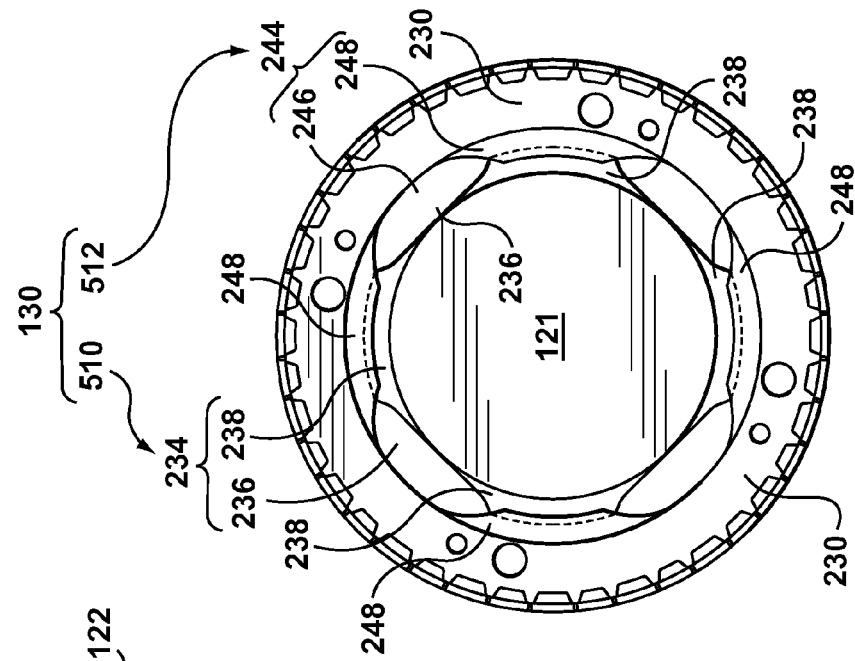

FIG. 6B depicts the end view of the lock 130 of FIG. 6A. The lock 130 is placed in the lockable condition.

Figure 6C:
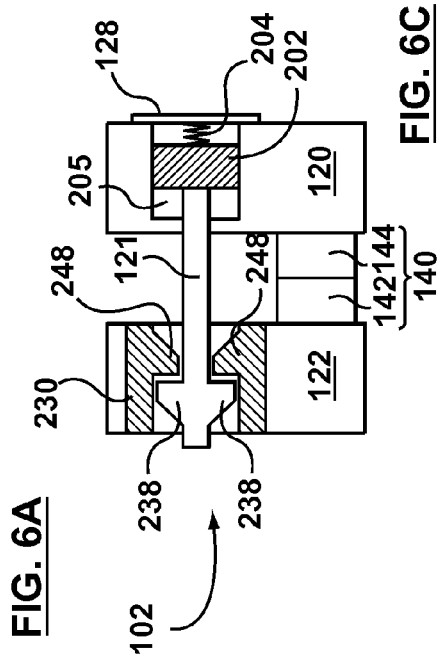

FIG. 6C depicts the cross-sectional schematic view of the lock 130 along the longitudinal axis of the clamp assembly 102 of FIG. 2A. The clamp assembly 102 is placed in the mold closed position, and the lock 130 is placed in the lockable condition. The gap between the teeth 238 and the teeth 248 is clearly visible in this view.

FIG. 7A depicts the perspective view of the clamp 128 of the clamp assembly 102 of FIG. 2A. The clamp 128 is positioned in the gap closed condition, and in this position the lock 130 is placed in the locked position. The chamber 205 has been pressurized just enough to cause: (i) the rod 121 to move along direction 505 sufficiently enough so as to cause the teeth 238, 248 to abut each other, and (ii) but not enough to impart or apply the clamp force to the rod 121 and the platen 120.

FIG. 7B depicts the cross-sectional schematic view of the clamp 128 along the longitudinal axis of the clamp assembly 102 of FIG. 2A. The clamp 128 is positioned in the gap closed condition in which: (i) the gap between the teeth 238, 248 has been taken up (that is, removed), and (ii) the teeth 238, 248 contact each other. The lock 130 in the locked condition; that is, the platen 122 is no longer movable relative to the rod 121. The hydraulic circuit is actuated so as to pressurize the fluid disposed in the chamber 205 sufficiently enough to push the piston 202 away from the platen 122, and as a result the rod 121 is pushed away from the platen 122 sufficiently enough to take up the gap between the teeth 238, 248 so that the teeth 238, 248 abut each other. The spring 204 becomes compressed, at least in part, to store some energy.

FIG. 8A depicts the perspective view of the clamp 128 of the clamp assembly 102 of FIG. 2A. The clamp 128 is actuated so that a clamping force 506 is applied to the rod 121. Since the rod 121 is locked to the platen 122, the rod 121 pulls the platen 122 toward the platen 120 so that the clamping force 506, in effect, is applied across the mold portions 142, 144 of the mold 140. Preferably, the clamps 128 are synchronously actuated so that: (i) reduce the cycle time of the system 100, and (ii) reduce the possibility of inadvertent wear to the mold 140.

FIG. 8B depicts the cross-sectional schematic view of the clamp 128 along the longitudinal axis of the clamp assembly 102 of FIG. 2A. The clamp assembly 102 is placed in the mold closed position, the lock 130 is placed in the locked condition, and the clamp 128 is actuated (that is, the clamping force 506 is applied to the rod 121).

Figure 8C:
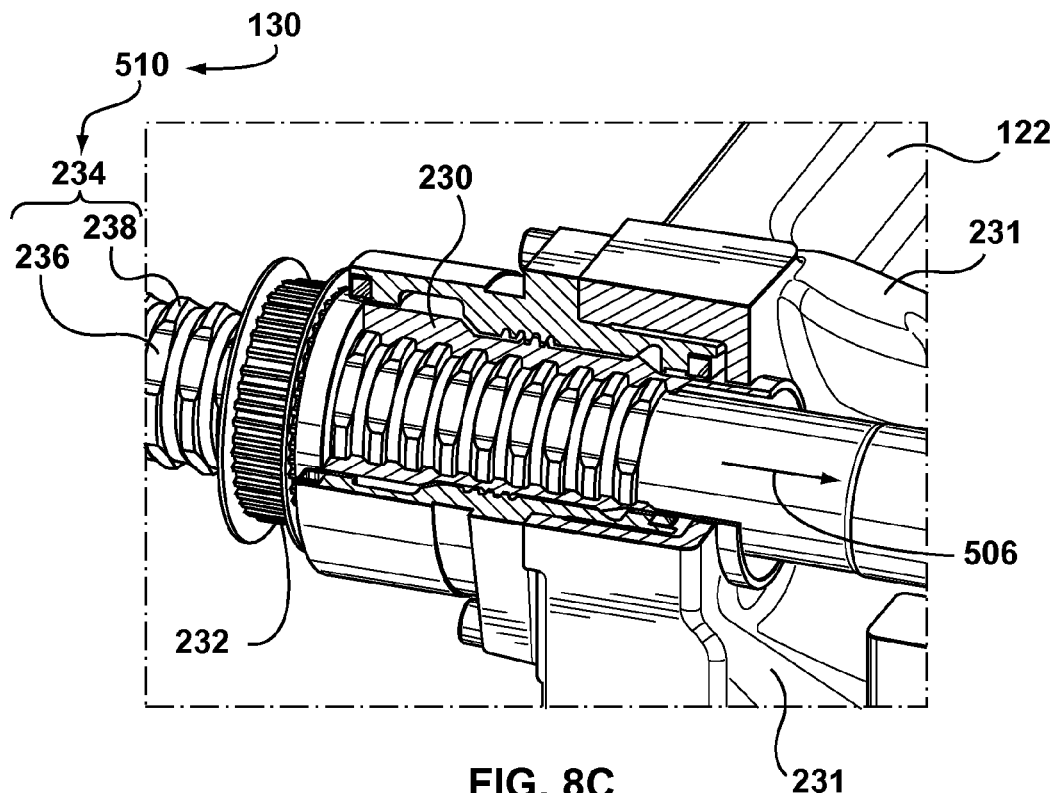
FIGS. 8C, 8D depict views of the lock 130 of FIG. 5A in which the clamp 128 is actuated.

FIG. 8C depicts the perspective view of the lock 130 of FIG. 5A in which the lock 130 is placed in the locked condition. The rod 121 is stretched as a result of transmitting the clamping force 506 to the platen 122.

Figure 8D:
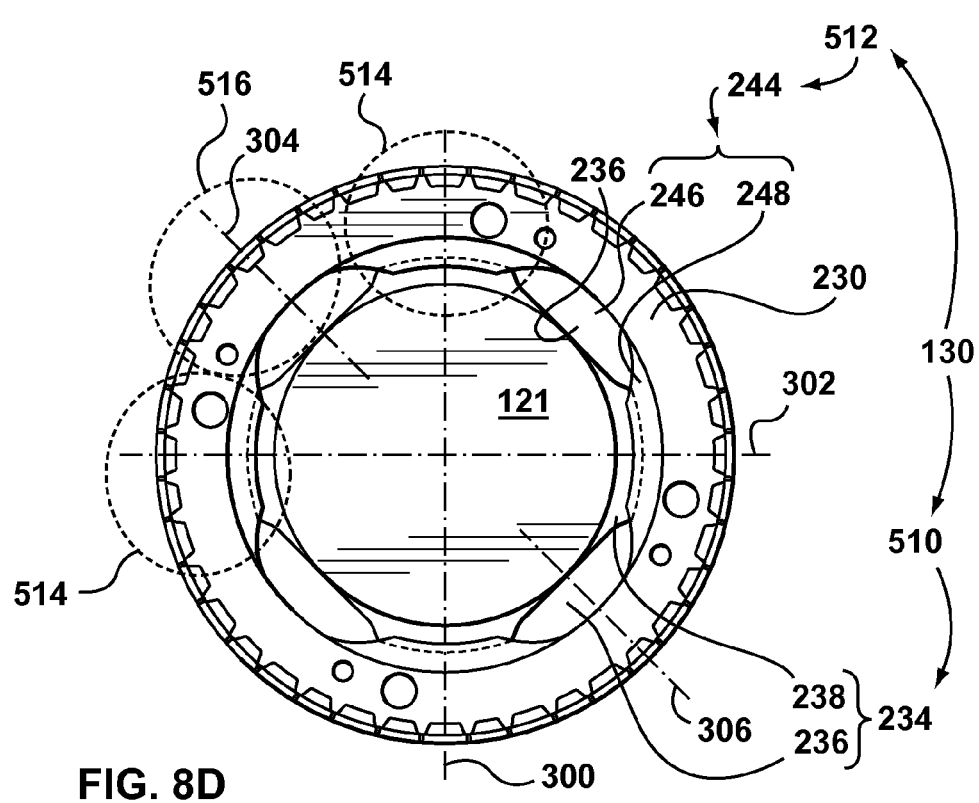

FIG. 8D depicts the end view of the lock 130 of FIG. 6A in which the lock 130 is placed in the locked condition. The hydraulic circuit increases the pressure of the fluid located in the chamber 205 sufficiently enough to push the piston 202 away from the platen 122, which in turn causes the rod 121 to become stretched since the platen 122 is has been locked to the rod 121. This arrangement, in effect, causes the rod 121 to transmit the clamping force 506: (i) across the teeth 238, 248, which is then transferred to the platen 122, and (ii) to the platen 120; in this manner the clamping force 506 is applied to the mold 140. As a result of receiving the clamping force 506, the platen 122 experiences load stresses that cause the platen 122 to bend or flex more at some zones relative to other zones of the platen 122; specifically, by way of example, the relatively lower flex zones 514 experience less stress in comparison to the stress experienced by a relatively higher flex zone 516. The location of these zones will depend on the structural supports associated with the platen 122; specifically, the structural supports are, by way of example, ribs 231 that provide supports for respective corners of a mold support structure of the platen 122; it is understood that the movable mold portion 142 is mounted to and is supported by the mold support structure of the platen 122.

Responsive to actuation of the lock actuator 132, the complementary lock member 512 engages with the lock member 510 (that is, the teeth 238, 248 become aligned with each other) at a position that is located proximate to the relatively lower flex zone 514 (hereafter referred to as the "zone 514") of the platen 122. The clamping force 506 is applied to the rod 121, and the rod 121 is pulled toward the platen 120 so that the teeth 238, 248 are placed in locking engagement with each other at the zone 514. A technical effect of the foregoing arrangement is reduced wear associated with the teeth 238, 248 (that is, reduced wear of the complementary lock member 512 and the lock member 510) since the zone 514 experiences less stress (due to stresses experienced by the platen 122) in comparison to the relatively higher flex zone 516 (hereafter referred to as the "zone 516") of the platen 122. The zone 516 will experience more flex (relative to the zone 514) as a result of the stresses associated with the platen 122 as a result of the platen 122 responding to the effects imposed by the clamping force. If the teeth 238, 248 engage with each other, at least in part, at the zone 516, the teeth 238, 248 may experience, disadvantageously, a higher degree of wear. The zone 516 has been removed from FIG. 8C so as to reveal the lock member 510 that is associated with the rod 121. In summary, the complementary lock member 512 is lockably engaged with the lock member 510 at a position that is proximate, at least in part, to the zone 514 of the platen 122 so as to reduce wear of the lock members 510, 512 once the clamping force 506 has been applied to the rod 121. A substantially maximum clamping force is applied to:

(i) a radially-extending axis 300 (hereafter referred to as the "axis 300") of the rod 121, and (ii) a radially-extending axis 302 (hereafter referred to as the "axis 302") of the rod 121. The axis 300 extends vertically from the 12 o'clock position to the 6 o'clock position. The axis 302 extends horizontally from the 3 o'clock position to the 9 o'clock position. The teeth 238, 248 engage with each other along the axis 300 and the axis 302. The teeth 238, 248 are not aligned along: (i) a radially-extending axis 304 (hereafter referred to as the "axis 304") of the rod 121, and (ii) a radially-extending axis 306 (hereafter referred to as the "axis 306") of the rod 121; however, the rod grooves 236 and the sleeve grooves 246 are aligned with each other at the axis 304. Support structure (such as the ribs 231, which are depicted in FIG. 8C) is placed on the platen 122 in such a position and configuration so as to prevent or substantially reduce the amount of stress that is experienced by the platen 122 along the axis 300 and the axis 302, which are aligned with the zones 514 of the platen 122. The ribs 231 provide added support and/or added stiffening to the zone 514 so that the platen 122 may experience less stress at the zone 514 once the clamping force 506 is transmitted from the rod 121 to the platen 122 (via the components of the lock 130); in this arrangement, advantageously, the components of the lock 130 experiences reduced wear. When the clamping force 506 is applied to the rod 121, as a result of orienting the teeth 238, 248 along the axis 300 and the axis 302 (that is, the teeth 238, 248 are aligned in the zone 514), the teeth 238, 248 (which are examples of the components of the lock 130) may experience less stress (therefore, less wear) as the platen 122 responds to receiving the clamping force 506 from the rod 121. If the teeth 238, 248 were to be lockably engaged at zone 516, the teeth 238, 248 may experience a greater degree of stress or wear since the zone 516 will flex more than the zone 514 since the zone 516 lacks support structure while the zone 514 relies on the support structure 231 to bear the burden off added stresses associated with the clamping force 506; it is understood that the support structure 231 is depicted, by way of example, as the ribs 231. According to a variant, the zone 514 of the platen 122 is nominally located approximately between an 11 o'clock position and a 1 o'clock position; preferably, the zone 514 is nominally located approximately at a 12 o'clock position. According to another variant, the zone 514 is nominally located approximately between an 8 o'clock position and a 10 o'clock position; more preferably, the zone 514 is nominally located at approximately a 9 o'clock position. In operation, responsive to transmission of the clamping force 506 from the rod 121 through the lock member 510, the complementary lock member 512 and then to the platen 122, wear of the lock member 510 and the complementary lock member 512 is reduced at least in part.

Figure 9A:
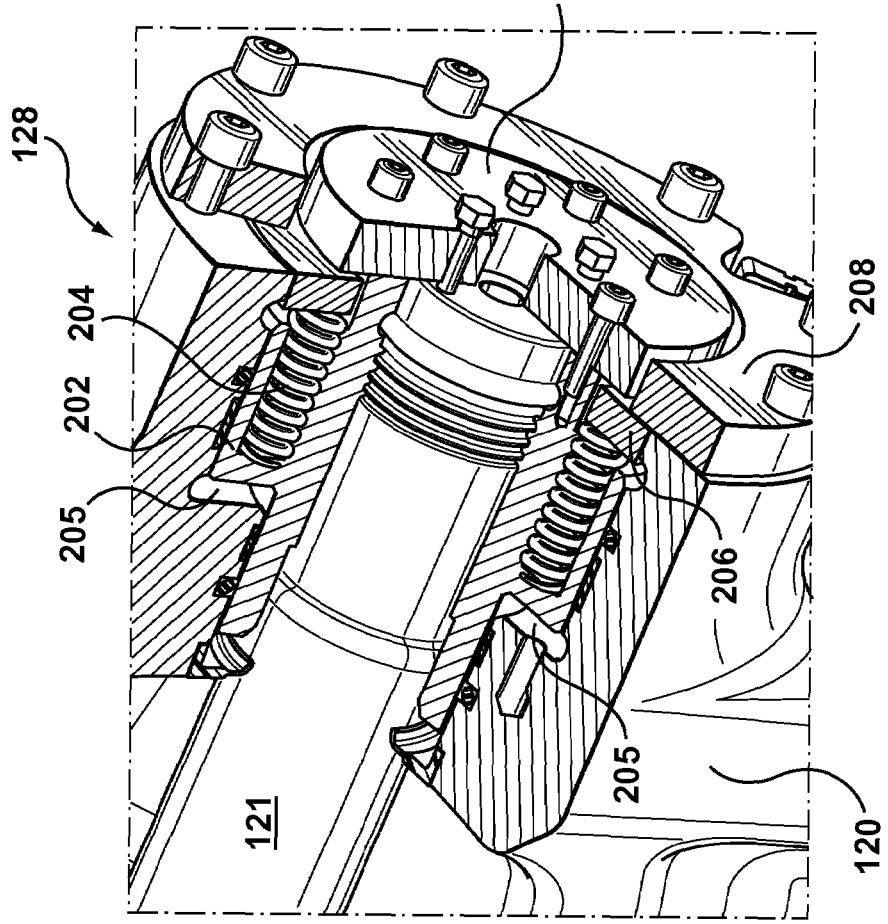
FIGS. 9A, 9B depict views of the clamp 128 of the clamp assembly 102 of FIG. 2A in which the clamp 128 is placed in a decompressed condition.

FIG. 9A depicts the perspective view of the clamp 128 of the clamp assembly 102 of FIG. 2A. The clamp 128 is placed in the decompressed condition; that is, the clamping force 506 is not applied. Specifically, the fluid located in the chamber 205 is relaxed or decompressed. A mold break actuator (not depicted; known to those skilled in the art) is actuated so as to break apart the moveable mold portion 142 from the stationary mold portion 144 (so as to overcome the frictional forces that hold the mold portions 142, 144 closed) so that the molded article molded may then be released and removed from the cavity defined by mold portions 142, 144.

Figure 9B:
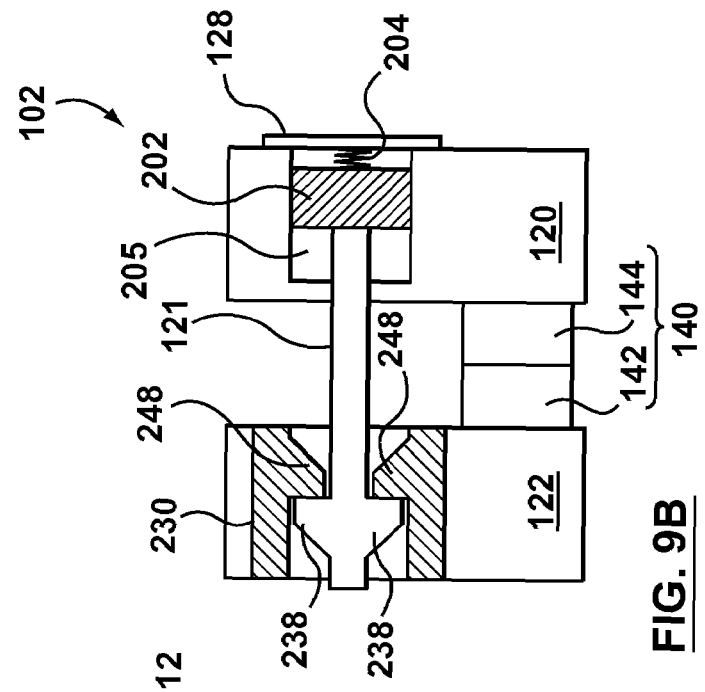

FIG. 9B depicts the cross-sectional schematic view along the longitudinal axis of the clamp assembly 102 of FIG. 2A. The clamp assembly 102 is placed in the mold closed position, the lock 130 is placed in the locked condition, and the clamp 128 is placed in the decompressed condition. The mold break force has not been applied in this view.

FIG. 10A depicts the cross-sectional schematic view of the clamp assembly 102 along the longitudinal axis of the clamp assembly 102 of FIG. 2A. The clamp assembly 102 is placed in the post mold break condition. In this condition, the lock 130 is placed in the lockable condition. Mold break has occurred, and the teeth 248, 238 have become separated from each other so that, in effect, a gap exists between the teeth 248, 238.

FIG. 10B depicts the cross-sectional schematic view of the clamp assembly 102 along the longitudinal axis of the clamp assembly 102 of FIG. 2A. The clamp assembly 102 is placed in the post mold break condition. The lock 130 is placed in the unlocked condition. The teeth 248, 238 have been rotated away from each other so they become misaligned relative to each other (and aligned with grooves 246, 236 respectively) so that the lock 130 is placed in the unlocked position, and the platen 122 is, in effect unlocked from the rod 121. The platen stroke actuators 123 are actuated so as to stroke the platen 122 away from the platen 120.

FIG. 10C depicts the cross-sectional schematic view of the clamp assembly 102 along the longitudinal axis of the clamp assembly 102 of FIG. 2A. The clamp assembly 102 is placed in the mold opened position. The molded article 145 may now be removed from the mold cavity of the mold 140.

FIG. 11A depicts the perspective view of the clamp 128 of the clamp assembly 102 of FIG. 2A. The mold flash condition has occurred in which too much of the injectable molding material was injected into the mold cavity of the mold 140 so as to cause inadvertent (unwanted) separation between the moveable mold portion 142 and the stationary mold portion 144. The clamp 128 is placed in the mold flash condition. As a result, the injectable molding material leaks (spurts) out from the mold 140 before the molded article 145 has been completely molded. The added pressure associated with injecting too much of the molding material into the mold cavity causes the piston 202 to move so as to abut an end face 310 that is defined by the housing 200, and thus push the fluid out from the chamber 205.

FIG. 11B depicts the cross-sectional schematic view along the longitudinal axis of the clamp assembly 102 of FIG. 2A. The clamp 128 is placed in the mold flash condition.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Preferable embodiments of the present invention are subject of the dependent claims. Therefore, what is to be protected by way of letters patent are limited only by the scope of the following claims:

What is claimed is:

1. A clamp actuator of a molding system having a rod, the clamp actuator comprising:
a first actuator configured to apply a clamping force to the rod, the first actuator including a piston coupled to the rod; and
a housing configured to receive the piston and accommodate sliding movement of the piston and the rod, the piston, the housing and the rod defining, in combination, a chamber, the chamber configured to accommodate a pressurizable fluid that is abuttable against the piston;
a second actuator configured to apply a force opposing the clamping force to the first actuator, the second actuator including:
a spring interactable with the first actuator, the spring biasing the first actuator so as to urge
the first actuator away from a force application position, responsive to the chamber being pressurized by a first amount of fluid pressure, the
pressurizable fluid urges the piston toward the spring, and the spring reacts to maintain the piston in a home position;
a piston stop plate coupled to an entrance of the housing, the piston is abuttable, at least in part, against the piston stop plate;
a reset stop coupled to the piston; and
a reset plate, the reset plate abutting the piston stop plate, the reset stop, and the spring; and
wherein responsive to actuating the first actuator, the rod is drivable between:
(i) the home position in which the clamping force is not applicable to the rod; and
(ii) the force application position in which the clamping force is applicable to the rod; and
responsive to a mold flash occurring which exceeds the clamping force, the rod moves into a mold flash position located on a side of the home position opposite the force application position.

2. The clamp actuator of claim 1, wherein the housing is coupled to a stationary platen.

3. The clamp actuator of claim 1, wherein:
the piston is coupled to a distal end of the rod, and
the reset stop is coupled to an end of the rod.

4. The clamp actuator of claim 1, wherein the spring is receivable, at least in part, in a recess defined by the piston.

5. The clamp actuator of claim 1, further comprising:
a fluid input connected to the chamber, the fluid input configured to deliver the pressurizable fluid to the chamber, the pressurizable fluid configured to actuate the piston.

6. The clamp actuator of claim 1, further comprising:
a piston seal configured to prevent fluid from flowing out of the chamber.

7. The clamp actuator of claim 1, further comprising:
a tie-bar lock mechanism including:
a lock member associated with the rod; and
a complementary lock member associated with a selected platen selected from platens, the complementary lock member being engageable with the lock member.

8. The clamp actuator of claim 1, further comprising:
a lock member associated with the rod, the lock member including:
(i) a row of rod-interrupted teeth extending from the rod; and
(ii) a rod groove extending along the row of rod-interrupted teeth; and
a complementary lock member associated with a selected platen selected from platens, the complementary lock member including:

(i) a row of sleeve-interrupted teeth extending from a sleeve, the sleeve coupled to the selected platen; and (ii) a sleeve groove extending along the row of sleeve-interrupted teeth, the row of rod-interrupted teeth of the lock member being rotatably engageable with the row of sleeve-interrupted teeth of the complementary lock member, the lock member and the complementary lock member being rotatably engageable relative to each other, the complementary lock member being engageable with the lock member.

9. A molding system, comprising:

a rod; and a clamp actuator including:

a first actuator configured to apply a clamping force to the rod ; the first actuator including a piston coupled to the rod; and a housing configured to receive the piston and accommodate sliding movement of the piston and the rod, the piston, the housing and the rod defining, in combination, a chamber, the chamber configured to accommodate a pressurizable fluid that is abuttable against the piston;

a second actuator configured to apply a force opposing the clamping force to the first actuator; the second actuator including:

a spring interactable with the first actuator, the spring biasing the first actuator so as to urge the first actuator away from a force application position, and responsive to the chamber being pressurized by a first amount of fluid pressure, the pressurizable fluid urges the piston toward the spring, and the spring reacts to maintain the piston in a home position;

a piston stop plate coupled to an entrance of the housing, the piston is abuttable, at least in part, against the piston stop plate;

a reset stop coupled to the piston; and a reset plate, the reset plate abutting the piston stop plate, the reset stop, and the spring; and wherein responsive to actuating the first actuator, the rod is drivable between:

(i) the home position in which the clamping force is not applicable to the rod, and (ii) the force application position in which the clamping force is applicable to the rod; and responsive to a mold flash occurring which exceeds the clamping force, the rod moves into a mold flash position located on a side of the home position opposite the force application position.

* * * * *